July 19, 1966   H. M. SCHRÖDER ETAL   3,261,076
METHOD OF MANUFACTURING PHOTO-ELECTRIC CELL
Filed Jan. 7, 1963
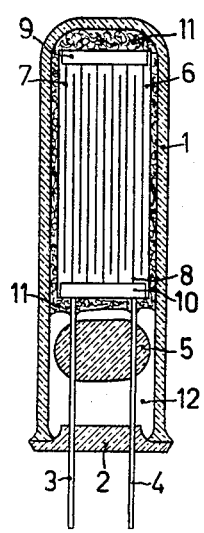
FIG.1a
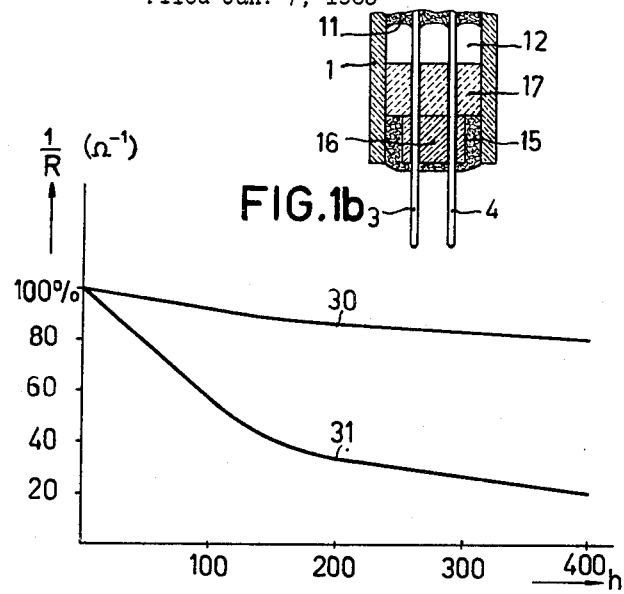
FIG.1b
FIG.3
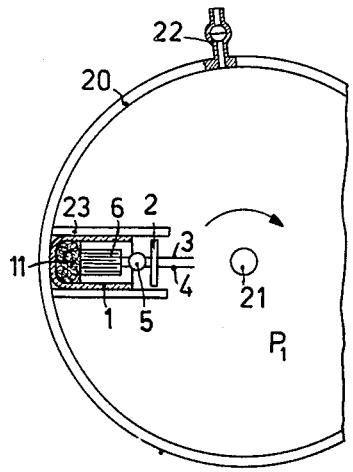
FIG.2a
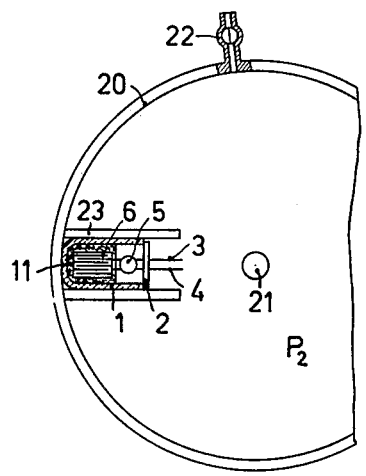
FIG.2b
INVENTORS
H. M. SCHRÖDER &
GERARDUS BOTS
BY
AGENT

United States Patent Office 3,261,076
Patented July 19, 1966

3,261,076
METHOD OF MANUFACTURING PHOTO-ELECTRIC CELL
Herman Mathieu Schröder and Gerardus Bots, Emmasingel, Eindhoven, Netherlands, assignors to North American Philips Company, Inc., New York, N.Y., a corporation of Delaware
Filed Jan. 7, 1963, Ser. No. 249,828
Claims priority, application Netherlands, Jan. 26, 1962, 274,024
6 Claims. (Cl. 29—25.11)

The invention relates to a method of manufacturing a photoelectric cell, in which a photo-sensitive body provided with electrodes or at least an active part of such a body is embedded in an insulating liquid or soft filler and preferably is hermetically sealed in a further envelope, for example a glass envelope. The invention further relates to a photo-electric cell manufactured by a method in accordance with the invention.

The photo-sensitive body of such photo-electric cells generally comprises a plate-shaped photo-resistive body consisting of a chalcogenide, especially of a bivalent metal such as, for example, CdS or CdSe. In a photo-electric cell commonly used in practice, this body consists of a sintered powder mixture, frequently a sintered powder mixture compressed with the use of a high pressure to form a compact body, and hence such bodies may have great coherence and an X-ray density of, for example, 90%. To ensure an intimate contact between the body and the filler the body provided with the electrodes and, as the case may be, with a support is immersed in a liquid filler or embedded, for example, by centrifuging, in a soft filler. The filler usually is a neutral substance, such as a silico-organic polymer, for example, silicone oil or silicone grease, if desired with the addition of substances for increasing the stability, for example, drying agents.

The method set forth in the preamble is used to stablize the electrical properties of photo-electric cells for a prolonged period of time by means of the filler and, if desired, of the hermetic seal, for it has been found that the said electrical properties are influenced by ambient gases, for example, water vapor, which may give rise to deterioration of certain properties if no special precautions are taken. Especially those portions of the surface which lie in the immediate proximity of the electrode system and hence form the most active parts of the body with respect to the photo-conductivity, prove to be highly sensitive to such influences. Although generally the entire surface area not covered by a support or by electrodes is covered with the filler, it is possible to cover only the active surface portions of the body, the term "active portion" being understood to mean a portion of the surface which provides an essential contribution to the photo-electric properties and the surface condition of which, especially as affected by ambient gases, influences the photo-electric properties.

It has been found, however, that in spite of the said precautions the stability of the electrical properties of the photo-electric cells mounted in this manner is unsatisfactory after use for some time, especially if the cells are operated at an elevated temperature or are heavily loaded electrically.

It is an object of the present invention to provide a simple method by which a material improvement of this stability can be obtained.

The invention is based inter alia on the recognition that one of the causes of the instability is formed by inclusions of gas which have a disturbing influence on the active portions and which occur at poorly accessible irregularly shaped areas or are contained by the minute pores present in the body in spite of its high density, and in course of the time, especially at an elevated temperature and the high load, appear at the active areas and thus interfere with the neutral or favourable effect of the filler.

Starting from this recogniztion, according to the invention in the method set forth in the preamble, the embedding is performed by first reducing the ambient pressure of the photo-sensitive body below atmospheric pressure and subsequently increasing this pressure, for example, to atmospheric pressure again in the embedded condition of the photo-sensitive body or at least of the active portion thereof. The term "atmospheric pressure" is used herein to mean the pressure of the ambient air, that is to say, about 1 atmosphere.

By this succession of reduction and increase of the ambient pressure it is ensured that in the reducing process air or gas is drawn off from the surface and the pores while by the subsequent increase in pressure in the presence of the filler the latter is pressed into the surface and/or the pores, so that the deleterious influence of gas inclusions is reduced. As will be shown hereinafter with reference to an example, a material improvement in the long-term stability can be obtained in this manner.

The ambient pressure is preferably reduced to less than 10 mm. of mercury, although a reduction to one half of the initial value already has a favourable effect. Particularly satisfactory results are obtainable by reducing the ambient pressure to less than $10^{-3}$ mm. of mercury. In the subsequent increase of the ambient pressure it is simple and appropriate to raise it rapidly to 1 atmosphere, but of course the final pressure may, if desired, be lower or higher.

The pressure may be reduced after the body has been embedded in the filler. However, in this case the air bubbles to be drawn off have to pass through the filler, which may give rise to spattering and the like. Preferably the photo-sensitive body or at least the active portion thereof is embedded in the filler after the pressure reduction, preferably by centrifuging, after which the pressure is raised. Preferably the body is hermetically sealed in a further, preferably glass, envelope, and this sealing process may suitably be combined with the embedding process by introducing the filler into the envelope prior to embedding and then embedding the body. Alternatively, however, the photo-sensitive bodies embedded in the manner in accordance with the invention may be stored for some time before sealing or the filler may be constituted by a hardenable synthetic resin, for example, an epoxy resin, which after the embedding process is hardened to form an envelope. However, sealing in a further envelope is to be preferred since this generally ensures a better hermetic seal.

It has been found that the invention is highly advantageous in photo-resistive bodies consisting of a chalcogenide, preferably of a bivalent metal, such as CdS or CdSe, and especially in the case of sintered, preferably compressed and sintered, photo-sensitive bodies. Particularly suitable fillers are silico-organic polymers, such as silicone oil or silicone grease, if desired with the addition of stabilizers. A soft filler, such as silicone grease, is to be preferred because afterwards it is less permeable to gas bubbles.

The invention also relates to a photo-electric cell comprising a photo-sensitive body which, or at least an active part of which, is embedded in a liquid or soft filler which has pentrated into the surface of the body, which cell is manufactured by a method according to the invention.

In order that the invention may readily be carried into effect, an embodiment thereof will now be described, by way of example, with reference to the accompanying diagrammatic drawings, in which FIGURE 1a is a longitudinal sectional view of a photo-resistive cell;

FIGURE 1b is a similar view of the terminal portions of a modification;

FIGURES 2a and 2b are diagrammatic plan views of two successive stages of the manufacture of a photo-electric cell as shown in FIGURE 1, and FIGURE 3 is a graph in which for two photo-electric cells the conductance $1/R$ is plotted as a function of time.

The method in accordance with the invention will now be described, by way of example, with respect to the manufacture of a photo-resistive cell of the kind shown in longitudinal sectional view in FIGURE 1.

The envelope of this cell is a glass tube 1 which has a diameter of about 5 mm. and a height of about 25 mm. and is sealed to a glass base 2 through which are passed the electric supply leads 3 and 4 which are sealed in a glass bead 5. This envelope (1, 2) contains a plate-shaped photo-resistive body 6 consisting, for example, of pressed and sintered CdS and having the dimensions $11 \times 3 \times 1$ mm.³. A suitable known technique for manufacturing such bodies is described in United States Patent 2,957,152. This photo-resistive plate 6 is provided at the front with two comb-shaped interlocking electrode line systems 7 and 8 which have been deposited from the vapour phase and are connected each to one of two nickel clamping members 9 and 10 which are clamped about the upper and lower edges respectively and are connected to the supply leads 3 and 4 respectively. The connection to the supply lead 4 is made at the back of the photo-resistive plate in a manner which is not visible in the figure. The photo-resistive plate provided with the electrodes 7 and 8 and the clamping members 9 and 10 is embedded in a soft filler 11 consisting of a silicone grease which protects the photo-sensitive surface against the influence of ambient gases. Whereas in the known photo-resistors this silicone grease engages only the surface of the photo-sensitive body, in a photo-cell according to the invention the soft filler has penetrated into the surface and the pores of the body. As a result the photo-electric properties remain substantially constant for a prolonged period of time, even with a high electric load, and the cell has a long life. Further, the occurrence of gas bubbles at the photo-sensitive surface owing to high electric loads or elevated temperatures is prevented and it is avoided that such gas bubbles should expel the grease into the empty space 12, and this is of particular importance for photo-electric cells which are sealed with the aid of synthetic resin and have a small gas-filled expansion chamber near the seal in view of the expansion of the filler. In this connection the invention is of particular importance for such a photo-electric cell which in contradistinction to the photo-electric cell shown in FIGURE 1 is provided with a seal of synthetic resin, for example, of an epoxy resin, which may be combined with a filler body, for example, of glass, which entirely or partially compensates for the larger expansion of the resin.

In FIGURE 1b such a photo-electric cell is partially shown in cross-section, the remaining part being identical with that of FIGURE 1a. In the embodiment of FIGURE 1b the glass envelope 1, which may have circular cross-section with an inner diameter of 3.8 mm., has been hermetically sealed by means of a synthetic resin layer 15, for example, an epoxy resin, which forms the bond between the wall 1 of the envelope and a compensation member 16. This compensation member is preferably used for compensating the thermal expansion coefficient of the resin 15, which may be about $350 \times 10^{-7}$, while the expansion coefficient of the glass envelope is only about $100 \times 10^{-7}$. The coefficient given is the increase in length per unit length per degree C. For that purpose the compensation member 16, which may consist of a pressed glass powder disc with a diameter of about 3.6 mm. and a thickness of about 2 mm., will have preferably an expansion coefficient smaller than that of the envelope, for instance of about $40 \times 10^{-7}$. The compensation member 16 rests on a hard paper disc 17 about 2 mm. thick, which is held with a clamping fit in the envelope 1. This embodiment also contains the empty space 12 as expansion chamber, which separates the filler 11 from the seal. The glass bead 5 may be omitted in this embodiment, and the hard paper disc 17 and the compensating disc 16 contain two holes, through which the conductors 3 and 4 are passed, and which are also filled up and hermetically sealed by the synthetic resin 15.

The manufacture of a photo-electric cell as shown in FIGURE 1a will now be described in greater detail with reference to the diagrammatic FIGURES 2a and 2b, which are plan views of two successive stages of this manufacture. In FIGURE 2a a glass envelope 1, which is partly filled with a soft filler 11 in the form of silicone grease, is arranged in a drum 20 which is mounted for rotation about a shaft 21 and can be connected to a valve 22 to a pump system for evacuation. At the commencement of the treatment the photo-sensitive plate with the supply leads 3 and 4, the bead 5 and the glass base 2 secured thereto is arranged on the filler 11 and held in position by a holder 23 shown diagrammatically. The drum 20 is then evacuated to a pressure $P_1$, for example, a pressure of $10^{-4}$ mm. of mercury, so that the air is drawn off even from the pores of the plate 6. The valve 22 is then closed after which the drum is rotated at a rate of 3000 revolutions per minute for a few minutes (the diameter of the drum is about 20 cm.), until the photo-sensitive plate 6 has been embedded in the filler 11. In this condition (FIGURE 2b) the drum is stopped, the valve 22 is opened and the atmospheric pressure is admitted. As a result the filler 11 is pressed into the surface and the pores of the body 6. The envelope containing the embedded photo-sensitive plate 6 is removed from the drum and sealed to the glass base 2 in the usual manner.

In the graph of FIGURE 3 the variation of the reciprocal of the resistance R (the conductance $1/R$ which is determined by measuring the photo current) as a percentage of the initial value, which corresponds approximately to a resistance R of 1500 ohms on illumination with 50 lux, is plotted along the vertical axis against the time $h$ in hours during which a photo-electric cell was subjected to an endurance test and which is plotted horizontally. In this endurance test the cell was exposed to an illumination of about 50 lux while being electrically loaded by 140 mw. at an ambient temperature of 50° C., which is equal to a cell temperature of about 80° C. The test was interrupted for measuring the conductance $1/R$ after 150 hours, after 300 hours and after 400 hours.

The line 30 shows the variation of the conductance of a photo-electric cell according to the invention of the kind shown in FIGURE 1 and manufactured in the manner described hereinbefore, while the line 31 relates to a photo-electric cell of the same construction and manufactured in substantially the same manner but without the successive pressure reduction and pressure increase. This figure clearly shows that the conductance (or the photo-current at a predetermined illumination) of the photo-electric cell in accordance with the invention is more constant in a considerable degree and decreases at a lower rate.

Finally it should be noted that within the scope of the invention many modifications may be made by one skilled in the art. For example, other photo-sensitive materials may be used in the photo-sensitive body or the photo-sensitive bodies may be manufactured differently, for example, by deposition from the vapour state onto a support. Although the stabilizing method according to the invention is particularly useful for sintered cells it may also be applied to advantage to other photo-electric cells.

What is claimed is:

1. A method of making a photo-electric cell, comprising providing a photosensitive body consisting essentially of a pressed and sintered powder mixture of a chalcogenide of a bivalent metal and including spaced electrodes to the body, subjecting at least the portion of said body containing the electrodes to a reduced pressure below atmospheric pressure to drive off gas inclusions, thereafter embedding said body portion containing the electrodes while under reduced pressure in an insulating flowable filling mass by centrifuging, thereafter increasing the pressure to press the filling mass against the surface of the said body portion, and thereafter hermetically sealing said embedded body in a glass envelope.

2. A method as set forth in claim 1 wherein the photosensitive body is selected from the group consisting of cadmium sulphide and cadmium selenide.

3. A method as set forth in claim 1 wherein the filling mass is a grease-like silico-organic polymer, and the envelope is hermetically sealed with a synthetic resin.

4. A method of making a photo-eilectric cell, comprising providing a photosensitive body consisting essentially of a pressed and sintered powder mixture of a chalcogenide of a bivalent metal and including spaced electrodes to the body, introducing an insulating flowable filling mass into a glass envelope, subjecting at least the portion of said body containing the electrodes to a reduced pressure to drive off gas inclusions, thereafter embedding said body portion containing the electrodes while under reduced pressure in the filling mass in the envelope by centrifuging, thereafter increasing the pressure to press the filling mass against the surface of the said body portion, and thereafter hermetically sealing said glass envelope.

5. A method as set forth in claim 4 wherein the envelope is sealed with a synthetic resin leaving an empty space to serve as an expansion chamber adjacent the filling mass.

6. A method of making a photo-electric cell, comprising providing a photosensitive body consisting essentially of a pressed and sintered powder mixture of a chalcogenide of a bivalent metal and including spaced electrodes to the body, embedding said body portion containing the electrodes in an insulating flowable filling mass by centrifuging, subjecting at least the portion of said body containing the electrodes and the surrounding filling mass to a reduced pressure below atmospheric pressure to drive off gas inclusions, thereafter increasing the pressure to press the filling mass against the surface of the said body portion, and thereafter hermetically sealing said embedded body in a transparent, substantially non-porous envelope.

References Cited by the Examiner
UNITED STATES PATENTS

| | | | |
|---|---|---|---|
| 2,125,413 | 8/1938 | Arnold | 117—61 X |
| 2,613,164 | 10/1952 | Toorks | 117—101 X |
| 2,644,770 | 7/1953 | Sadowsky | 117—101 X |
| 2,847,332 | 8/1958 | Romadanoff | 117—101 X |
| 2,881,340 | 4/1959 | Rose | 250—211 X |
| 2,948,050 | 8/1960 | Van Vessem et al. | 117—101 X |

CHARLIE T. MOON, *Primary Examiner.*

RALPH G. NILSON, WHITMORE A. WILTZ,
*Examiners.*

W. STOLWEIN, W. I. BROOKS,
*Assistant Examiners.*